Nov. 30, 1943.  M. C. MEYER  2,335,294
METHOD OF MAKING SPHERICAL ARTICLES
Filed April 12, 1941  2 Sheets-Sheet 1
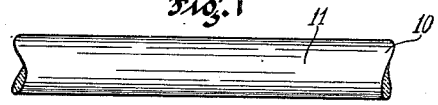
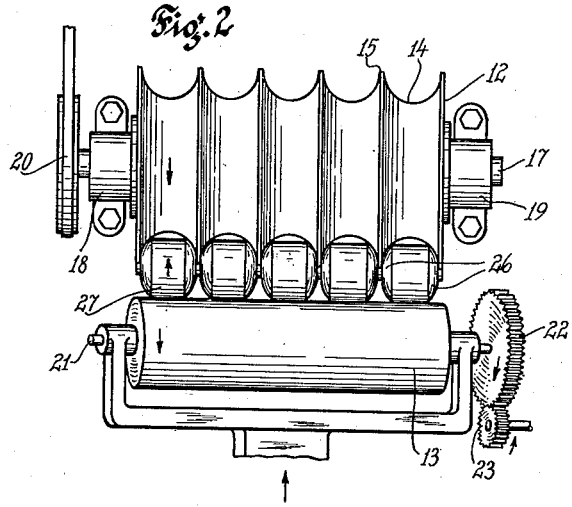
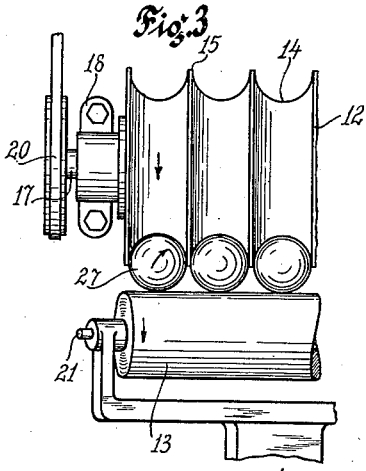
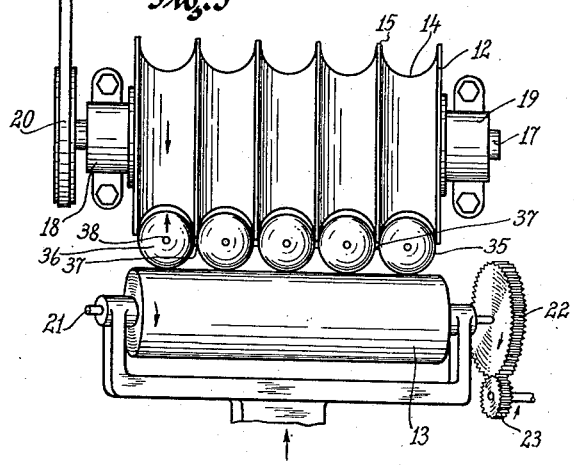
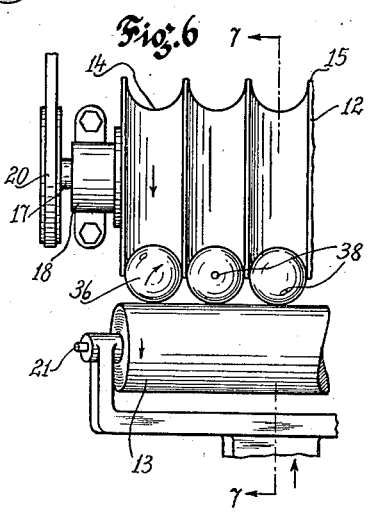
INVENTOR
Maximilian C. Meyer
BY Ostrolenk & Greene
ATTORNEYS Nov. 30, 1943.　　　　　M. C. MEYER　　　　　2,335,294
METHOD OF MAKING SPHERICAL ARTICLES
Filed April 12, 1941　　　2 Sheets-Sheet 2
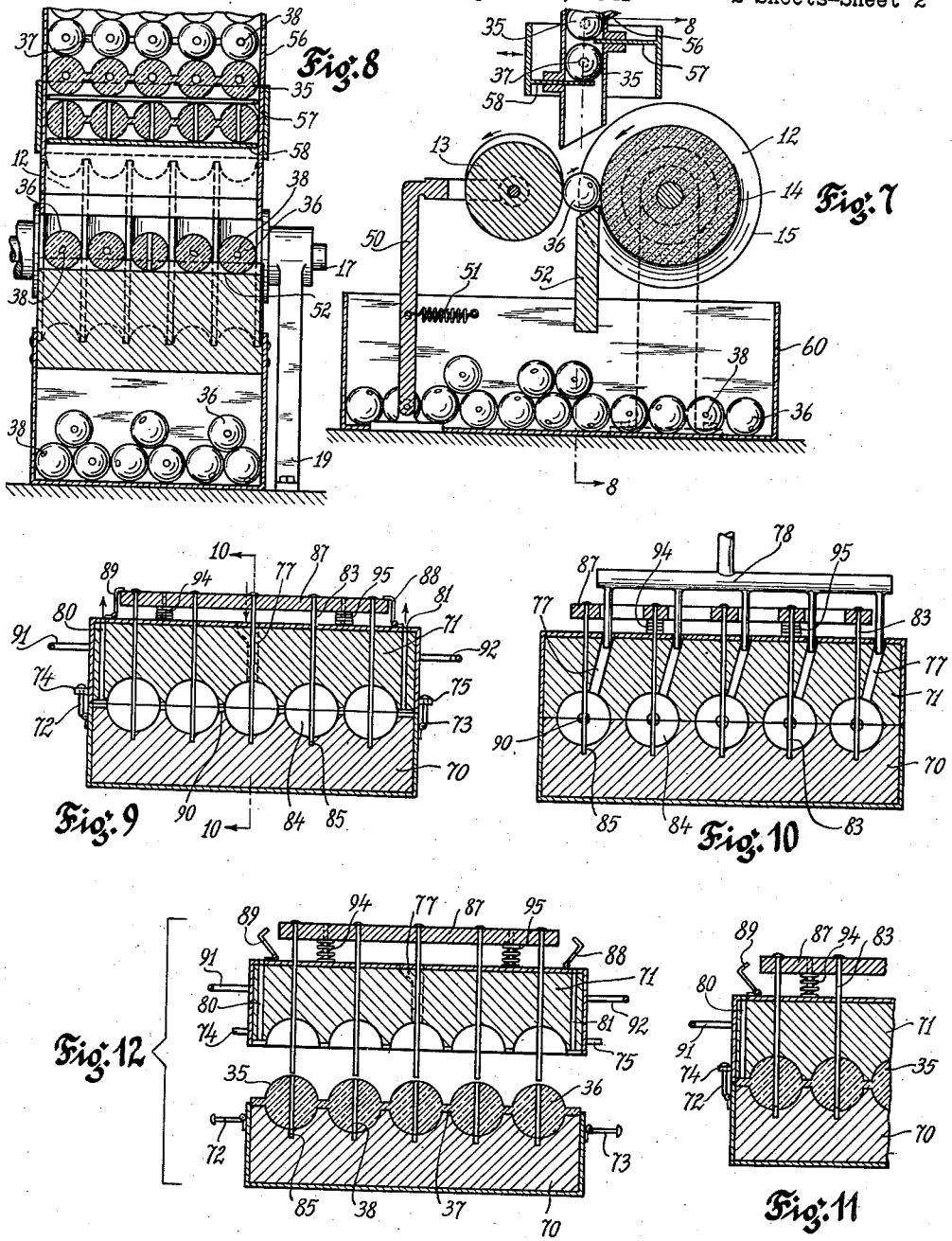
INVENTOR
Maximilian C. Meyer
BY
Ostrolenk & Greene
ATTORNEYS Patented Nov. 30, 1943

2,335,294

UNITED STATES PATENT OFFICE 2,335,294

METHOD OF MAKING SPHERICAL ARTICLES

Maximilian C. Meyer, Brooklyn, N. Y.

Application April 12, 1941, Serial No. 388,206

1 Claim. (Cl. 18—47.5)

This application is a continuation in part of my copending application Serial No. 340,157, filed June 12, 1940, for Curved surface light reflecting ornament.

My invention relates to a novel method of forming curved objects from plastics and to the articles produced thereby. My invention more particularly relates to a method of forming generally spherical articles, such as beads, marbles, etc., by forming an elongated plastic body of generally rod-like shape and removing material from spaced areas along said rod, as by grinding or cutting, to simultaneously form a plurality of substantially spherical objects such as, for example, beads. The rod-like plastic body may have a uniform cylindrical surface or it may comprise an integral rod-like body formed from a plurality of aligned spherical elements connected by gates. This rod-like body is similarly ground, the connecting gates being ground away and the peripheral surface of the resulting spheres being ground down to a desired size and uniformity.

My invention further relates to a process of removing surface irregularities and imparting a desirable roundness to the spherical objects by causing said spherical objects to rotate in various directions while in grinding contact with a grinding wheel and a pushing roller.

In application Serial No. 340,157 of which this is a continuation in part I described a method of making generally spherical ornamental objects having different areas of light reflectivity by forming a plastic rod having light reflecting particles particularly oriented therein, and then grinding that rod in a particular manner so as to produce a multiplicity of spherical ornamental objects having areas of strong light reflectivity and areas of weak light reflectivity.

The present application is directed to the mechanical process of forming spherical objects from rod-like plastic bodies as disclosed in said application.

The rod-like plastic body may be either in the form of a plastic cylinder or it may comprise a series of aligned spherical plastic objects integrally connected together.

It is, therefore, the object of my invention to produce simultaneously a plurality of spherical objects.

It is a further object of my invention to produce simultaneously a multiplicity of bead-like bodies having bead holes therein.

It is a further object of my invention to simultaneously form from a single plastic rod a multiplicity of spherical plastic objects.

It is a further object of my invention to produce simultaneously from a rod-like plastic body a multiplicity of spheres by grinding said rod-like plastic body with a grooved grinding roll.

It is a further object of my invention to so treat the generally spherical bodies produced from said plastic bodies so as to produce a smooth and uniform surface thereon and to insure a desirable accuracy of roundness.

It is a further object of my invention to simultaneously produce by means of a rapid and accurate process a multiplicity of plastic bead-like bodies.

The objects above set forth are accomplished generally by forming a rod-like plastic body having a generally circular cross-section by casting, molding, extruding or injection molding a plastic and subjecting this rod-like plastic body to the grinding action of a grooved roll to simultaneously separate such body into a multiplicity of spheres.

Various other objects of my invention and the manner in which I carry out these objects will be apparent from a consideration of the drawings and the detailed description thereof which here follows.

Figure 1 is a side view of the plastic rod which may be employed to form the spherical bodies according to my invention.

Figure 2 is a plan view of the apparatus of my invention illustrating the method of forming the spheres from the plastic rod.

Figure 3 is a partial plan view showing a subsequent step in the formation of the spherical bodies according to my invention.

Figure 4 is a side view of a plastic body of circular cross section consisting of aligned generally spherical bodies connected by gates which I may employ to form the spheres or beads according to my invention.

Figure 5 is a plan view of the apparatus of my invention showing a process of forming separate spheres or beads from the aligned spheres shown in Figure 4.

Figure 6 is a partial plan view of the apparatus of my invention showing a subsequent step of rotating the detached spheres in various directions after their separation to secure the desired smoothness and roundness thereof.

Figure 7 is a cross section taken along the line 7—7 of Figure 2 or Figure 5 to more clearly illustrate the method of separating the plastic body into individual spheres.

Figure 8 is a cross section taken along the line 8—8 of Figure 7.

Figure 9 is a cross section of the injection molding apparatus by means of which I may form the aligned plastic bodies.

Figure 10 is a cross section taken along the line 9—9 of Figure 9.

Figure 11 is a partial section of the injection molding apparatus shown in Figure 9 showing the spring retraction of the core members.

Figure 12 is a cross section showing the complete release of the mold parts.

Referring now more specifically to the drawings, in Figure 1 I show a rod 10 having a cylindrical surface 11 of plastic material. This rod may comprise any suitable plastic such as polymerized resins, methyl methacrylate or ethyl methacrylate, or similar alkyl esters of acrylic acid or conjoint polymerization products thereof. Other resins, such as phenol formaldehyde and urea formaldehyde condensation products, vinyl compounds, etc., may also be employed. Alternatively plastics such as the cellulosic derivatives including without limitation cellulose nitrate, cellulose acetate and cellulose ethers, such as ethyl cellulose may be suitably used.

The plastic may be formed into rod-like shape by any suitable molding operation such as casting, injection molding, extrusion or pressure molding.

The so formed pastic rod 10 is then positioned for grinding between the grinding wheel 12 and the pusher roll 13. The grinding wheel 12 comprises a series of semi-circular grooves 14 separated by peaks 15. The grinding wheel 12 and the pusher roll 13 both have surfaces formed from said suitable abrasive material such as that sold under the trade-name of Carborundum.

The grinding wheel 12 is mounted on the shaft 17 supported in the suitably fixed bearings 18 and 19. The rotary power is supplied by means of the pulley and belt 20. Rotation is in the direction indicated by the arrow. The pusher roll 13 mounted on the shaft 21 is impelled towards the grinding wheel 12 as shown by the arrow and is rotated as by the cooperating driven gears 22 and 23.

The speed of the grinding wheel 12 is about 4,000 R. P. M. while the speed of the pusher roll 13 is much slower, being about 75 R. P. M.

The rod 10, thus pressed against the grinding wheel 12 by the pusher roll 13, is then ground by the grinding surface of the grinding wheel, and the peaks 15 of the grooves of the grinding wheel remove material from spaced areas along the rod, the intermediate stage of this grinding operation being shown in Figure 2. It will be noted that the sides 26 of the individual spherical shaped rod elements 27 are given a concave curvature by the grinding grooves 14 while the peaks 15 are engaged in grinding away the complete radius of the rod to separate the adjacent elements of the rod from one another. The grinding wheel 12 and the pusher roll 13 move in the same direction and the differential in speed between the faster grinding wheel and the slower pusher roll effects the grinding action. The grinding is continued until each of the different rod elements 27 are separated from one another, the peaks 15 grinding away completely the connections between the different elements 27 while at the same time concave grooves 14 shape the rod elements 27 so as to impart a spherical curvature thereto.

It is a further feature of my invention that I adjust the axial directions of the grinding wheel 12 and the pusher roll 13 with respect to one another so that after the separation of the rod elements 27 from one another, these generally spherical rod elements 27 are caused to rotate or spin in various directions while being ground between the grinding wheel 12 and the pusher roll 13. This is effected by tilting or canting the shaft 21 of the pusher roll 13 with respect to the grinding wheel 12. Bearing in mind that the view of Figures 2 and 3 is a plan view looking down on the apparatus, it will be noted that although the shaft 21 is tilted with respect to the grinding wheel 12, this tilting is in one direction only and the roll 13 is substantially equidistant from the grinding wheel 12 at all points so that spherical rod elements 27 or substantially equal diameter are formed. The tilting is very slight and may for example be on the order of $\frac{1}{64}$th of an inch or less with respect to the axis of the grinding roll 12. That is, one end of the shaft 21 of the pusher roll 13 is $\frac{1}{64}$ of an inch or less higher than the corresponding end of the shaft 17 of the grinding wheel 12. The tilting, for purposes of illustration, is shown in exaggerated form in Figures 2 and 3 since it will be noted that a considerable side portion of the roll 13 and the gears 22 and 23 can be seen. Actually the tilt is so slight as to be visually almost imperceptible.

After the rod elements 27 are separated from one another by the grinding action during which time they are given a generally spherical or ball shape, the so-formed rod-elements or balls 27 are caused to rotate in various directions as shown by the arrow. This rotation in various directions is caused by the slight tilting of the pusher roll 13 because the tilted pusher roll tends to rotate the freely movable balls 27 in a direction other than that of the rotating grinding wheel 12. Since the ball 27 rotates in various directions other than the normal direction parallel to the direction of the grinding wheel 12, it spins about while being ground and its entire periphery is ground evenly, surface irregularities being removed and uniform roundness obtained. When the desired dimension has been reached and roundness achieved, and this is dependent upon the time of grinding, the pusher roll 13 is retracted from the grinding wheel 12 and the spherical balls 27 drop into a suitable container.

In Figure 4 I show a rod element 35 comprising a series of aligned spherical elements 36 connected by gates 37. When spherical elements 36 are to be converted into beads they may be provided with bead holes 38. As will be subsequently shown this rod 35 is preferably formed by injection molding but can be formed by any method desired. By forming the rod 35 as shown, it is possible to eliminate a substantial amount of grinding and eliminate the corresponding waste in ground material. Inasmuch as economy in time and material is important in the formation of the ball or bead elements of the class described here, the saving effected is of importance.

The method of separating the rod 35 into the individual spherical elements or beads is the same as that shown and described in connection with Figures 2 and 3. The rod 35 is dropped between the grinding wheel 12 and the pusher roll 13 and the peaks 15 of the grinding wheel 12 grind away the gates 37 between the spherical rod elements 36, the concave grooves 14 contacting the spherical elements 36 and grinding the periphery thereof to produce balls or beads having the desired curvature, surface uniformity and size.

As recited above it is an important feature of my invention that after the gates 37 between the rod elements 36 are ground away, the individual ball elements or bead elements so formed are caused as shown in Figure 6, to rotate in various directions by the inclination of the pusher roll 13 with respect to the grinding wheel 12. The rotation or spinning of these balls 36 in various directions while their grinding between the grinding wheel 12 and the pusher roll 13 is continued is of particular importance in grinding a rod of the type shown in Figure 4. This is because when such a rod is formed by injection molding there is a mold line or fin produced at that point where the mold elements meet and additionally there is an irregularity at that point where the gates 37 connect the aligned spherical elements 36. By rotating these separated balls in all directions during the grinding thereof, all such surface irregularities are removed and additionally a very desirable surface roundness is imparted to the ball.

Although I have shown the bead hole 38 as formed originally in the rod 35 in a direction transverse to the axis thereof, it is within the purview of my invention to form this hole in the respective balls or beads by so molding either the plastic rod 10 or the plastic rod 35 as to provide a hole therein running axially along the rod. That is, the hole is positioned at the axis of the rod and extends through the spherical elements 36 and the gates 37 in the case of the rod 35. This axial hole not only eliminates the difficulties of the pin molding operation to be described later but also reduces the amount of gate material to be ground away, since the gates are hollow.

Referring now to various details of my invention, I show in Figure 7 a cross section taken along the line 7—7 of Figure 6, and in this figure I have included the hopper 56 from which the rods are fed to the grinding wheel. I further show the manner in which the pusher roll 13 is impelled towards the grinding wheel 12.

The pusher roll 13 is mounted on some suitable member 50 and impelled by means of a spring 51 toward the grinding wheel 12. An apron member 52 supports the ball 36 in position during the grinding thereof. The plastic rod and the spheres formed therefrom are maintained during the grinding operation at a point just below the center of the pusher roll 13. Thus the rod is locked between pusher roll 13, grinding wheel 12 and apron 52.

The plastic rods 35 are fed from the hopper 56 into position between the grinding wheel 12 and the pusher roll 13 by reciprocating feed plates 57, 58 which work together. After the balls have been properly ground the pusher roll 13 is retracted from the grinding wheel 12 by some suitable means not here shown and the ball 36 drops into the bin 60. The pusher roll 13 directly thereafter is returned to the operating position and the next rod 35 shown in position between the plates 57 and 58 is released and dropped into place by the movement to the left of the plate 58. As the plate 58 moves to the left the plate 57 moves with it and this plate 57 serves to keep the rod above from falling at the same time. After the rod is delivered to the grinding wheel, the plates 57 and 58 move back to the position here shown whereupon the next rod moves into position. It is important that the side walls of the hopper 56 as shown in Figure 8 be spaced apart a distance exactly equal to the length of the rods 35 since otherwise the rods 35 will tend to nest upon each other and the delivery mechanism will not function properly. This nesting is due to the irregular shape of the rods.

The linear speed of the grinding wheel 12 is considerably greater than the speed of the pusher roll 13 as has been pointed out hereinbefore. The grinding wheel preferably travels at 4,000 R. P. M. while the pusher roll travels at 75 R. P. M. Thus, since the pusher roll has an abrasive surface it tends to retard the rotation of the rod 35 so that the grinding surface of the high speed grinding wheel 12 acts to grind the rod at the points of contact therewith. I have found that the speed of the grinding wheel should be at least 30 times as great as the speed of the pusher roll.

In Figure 9 I show diagrammatically a method of forming the rod 35 by injection molding. I employ a two part mold comprising a lower section 70 and an upper section 71 suitably secured together by pivoted pins 72 and 73 which lock into engagement with extension members 74 and 75. I provide handles 91 and 92 for separating the upper section 71 from the lower section 70 of the mold. Central feed lines 77 shown more clearly in Figure 10 feed a suitable plastic into the mold cavities from a main line 78. Vents 80 and 81 are provided at the termini of the mold cavities to allow the air displaced by the plastic to be expelled.

When it is desired to mold bead holes in the spherical elements I provide pins 83 which pass through the mold cavities 84 and are seated in seats 85 in the cavities 84 in a direction transverse to the axis of the rod. Pins 83 are suitably affixed to a plate 87, the plate 87 being maintained in operative position by the locking members 88 and 89.

With the mold parts closed in operative position as shown in Figures 9 and 10, a plastic which has been softened by its proper combination with the plasticizer and solvent as is well known in the art, is then heated to obtain the proper fluidity and forced under high pressure from the main line 78 into the mold cavities 84. The plastic enters the mold from the feed lines 77 and passes through the various gate members 90 into all of the mold cavities, air being expelled from the mold cavities through the vents 80 and 81.

After the plastic has been set and hardened to the proper state of solidity, the locking members 88 and 89 are released and as shown in Figure 11, the plate 87 moves upwardly under the impulse of the springs 94 and 95. The pins 83 which are positively attached to the plate 87 are thus caused to move upwardly through the molded plastic so that the upper part of the mold can be readily removed.

Then, as shown in Figure 12 the upper section 71 of the mold is separated from the lower section 70 by releasing the pins 72 and 73 and the completely formed plastic rod 35 can then be removed from the mold.

Fins are usually found on the spherical elements of the rod at that point where the mold sections 70 and 71 come together and it is the removal of these fin lines as well as the removal of the gates between the spherical elements and any irregularities occasioned by the fins or the gates that is effected by the grinding process set forth above.

By preforming the bead holes in the beads I eliminate the necessity for subsequent drilling of the bead holes in the beads after their formation.

This saves time and avoids the chipping or cracking at the edges of the holes in the beads that often result from such drilling. The preforming or molding of the bead hole 38 in the bead or ball elements has a special advantage which readily can be determined by inspection of the finished bead. When a hole is drilled in the bead the rough walls of the hole on the interior of the bead have a frosted appearance that can partially be eliminated by inserting therein a heated pin or a pin carrying a solvent, which tends to smooth out the drilled surface. However, when the bead is transparent and is used in that transparent state, the roughness of the walls of the bead is apparent from the outside. In contradistinction thereto when the bead hole is molded therein during the molding of the bead as shown and described hereinabove a smooth bead wall is obtained which decidedly enhances the appearance of the final bead, especially in the case of the bead formed of a transparent material.

The spherical rod elements 36 which are connected in alignment by the gates 37 and form the rod 35 may be termed a chain of balls spaced from one another by said gates. Peaks 15 on the grinding wheel 12 are elements of the grinding surface which are particularly adapted to remove the material between the spherical elements 36.

Because of the surface irregularities including fins, spurs and gate marks, I prefer to form the balls or bead elements slightly oversize so that a working tolerance is provided. Then by grinding the entire periphery of the ball, I can both remove all the surface irregularities and at the same time bring the balls or beads to the desired size.

By using the injection mold apparatus shown, I can form a number of rods 35 in a single operation and I can form either a series of rods of the same diameter or of varying diameters as desired.

It is important that an allowance be made in calculating the size and the spacing of the spherical elements 36 in the rod 35 from one another for the slight shrinkage that takes place during the setting of the plastic. This spacing of the elements 36 and the size of the gates 37 is of importance since it is essential that the grooves and peaks of the grinding wheel fit exactly with the spherical elements 36 and the gates 37. Thus the grooves and the grinding spaces here termed peaks must be uniformly spaced in accordance with the dimensions of the spherical elements 36 and the gates 37.

It is also within the purview of my invention to form beads with bead holes integrally molded therein from a rod having a generally cylindrical surface by forming a rod such as that shown in Figure 1 with a plurality of bead holes extending through the rod in a direction transverse to the axis thereof, the bead holes being so spaced so that they will lie in that portion of the rod that is least ground away in the manufacture of the beads.

It is also within the contemplation of my invention to form articles having an oval shape by using a grinding wheel having grooves which are not quite semi-circular.

It is to be understood that although I obtain an element that is generally spherical by the actual grinding operation of the grinding wheel during the operation of severing the different sections of the rod from one another, it is by spinning the severed ball elements or sections around in various directions while the grinding is continued that I obtain a much more exact roundness in addition to surface uniformity.

Although I have given a number of specific examples of my invention, it is to be understood that various modifications will be apparent to those skilled in the art and I, therefore intend to be limited not by the specific examples here given, but only by the claim hereto appended.

I claim:

A method of making spherical articles which comprises casting a chain of balls connected in alignment, grinding said chain between a grinding means and a pusher means to remove said connections, said grinding means and pusher means being tilted with respect to one another, thereby rotating said balls in various directions while grinding said balls to obtain surface uniformity and roundness.

MAXIMILIAN C. MEYER.